(12) United States Patent
Sengupta et al.

(10) Patent No.: US 8,321,492 B1
(45) Date of Patent: Nov. 27, 2012

(54) SYSTEM, METHOD, AND COMPUTER PROGRAM PRODUCT FOR CONVERTING A REDUCTION ALGORITHM TO A SEGMENTED REDUCTION ALGORITHM

(75) Inventors: Shubhabrata Sengupta, Davis, CA (US); Michael J. Garland, Lake Elmo, MN (US)

(73) Assignee: NVIDIA Corporation, Santa Clara, CA (US)

( * ) Notice: Subject to any disclaimer, the term of this patent is extended or adjusted under 35 U.S.C. 154(b) by 927 days.

(21) Appl. No.: 12/333,244

(22) Filed: Dec. 11, 2008

(51) Int. Cl.
*G06F 15/80* (2006.01)
(52) U.S. Cl. .......... 708/620; 345/505; 345/501
(58) Field of Classification Search .......... 708/620
See application file for complete search history.

(56) References Cited

U.S. PATENT DOCUMENTS

| | | | |
|---|---|---|---|
| 4,628,483 A | 12/1986 | Nelson | |
| 4,855,937 A | 8/1989 | Heartz | |
| 5,193,207 A | 3/1993 | Vander Vegt et al. | |
| 5,274,718 A | 12/1993 | Leonardi et al. | |
| 5,594,844 A | 1/1997 | Sakai et al. | |
| 5,621,908 A | 4/1997 | Akaboshi et al. | |
| 5,650,862 A | 7/1997 | Shimizu et al. | |
| 5,963,212 A | 10/1999 | Bakalash | |
| 6,065,005 A | 5/2000 | Gal et al. | |
| 6,489,955 B1 | 12/2002 | Newhall, Jr. | |
| 6,518,971 B1 | 2/2003 | Pesto, Jr. et al. | |
| 6,556,200 B1 | 4/2003 | Pfister et al. | |
| 6,825,839 B2 | 11/2004 | Huang et al. | |
| 6,879,980 B1 | 4/2005 | Kothuri et al. | |
| 7,146,486 B1 | 12/2006 | Prokopenko et al. | |
| 7,194,125 B2 | 3/2007 | Vlasic et al. | |
| 7,348,975 B2 | 3/2008 | Reshetov et al. | |
| 7,580,927 B1 | 8/2009 | Abugov et al. | |
| 7,616,782 B2 | 11/2009 | Badawy | |
| 7,903,125 B1 | 3/2011 | Ayers et al. | |
| 8,243,083 B1 | 8/2012 | Garland et al. | |
| 8,264,484 B1 | 9/2012 | Lauterbach et al. | |
| 2003/0028509 A1 | 2/2003 | Sah et al. | |
| 2004/0210596 A1 | 10/2004 | Budd et al. | |
| 2005/0001844 A1 | 1/2005 | Naegle | |
| 2005/0177564 A1 | 8/2005 | Kobayashi et al. | |
| 2007/0159488 A1* | 7/2007 | Danskin et al. | 345/505 |
| 2007/0165035 A1 | 7/2007 | Duluk, Jr. et al. | |
| 2007/0169042 A1 | 7/2007 | Janczewski | |
| 2007/0182732 A1 | 8/2007 | Woop et al. | |
| 2007/0260663 A1 | 11/2007 | Frigo et al. | |
| 2007/0264023 A1 | 11/2007 | Gorrell et al. | |
| 2008/0043018 A1 | 2/2008 | Keller et al. | |

(Continued)

FOREIGN PATENT DOCUMENTS

WO 2007082042 A2 7/2007

(Continued)

OTHER PUBLICATIONS

U.S. Appl. No. 12/333,255, filed Dec. 11, 2008.

(Continued)

*Primary Examiner* — Tammara Peyton
(74) *Attorney, Agent, or Firm* — Zilka-Kotab, PC (57) ABSTRACT

A system, method, and computer program product are provided for converting a reduction algorithm to a segmented reduction algorithm. In operation, a reduction algorithm is identified. Additionally, the reduction algorithm is converted to a segmented reduction algorithm. Furthermore, the segmented reduction algorithm is performed to produce an output.

16 Claims, 7 Drawing Sheets

U.S. PATENT DOCUMENTS

| | | | |
|---|---|---|---|
| 2008/0316214 A1 | 12/2008 | Peeper | |
| 2009/0089542 A1 | 4/2009 | Laine et al. | |
| 2009/0106530 A1 | 4/2009 | Lauterbach et al. | |
| 2009/0132878 A1 | 5/2009 | Garland et al. | |
| 2010/0076941 A1 | 3/2010 | Dotsenko et al. | |

FOREIGN PATENT DOCUMENTS

| | | | |
|---|---|---|---|
| WO | 2008127610 A2 | 10/2008 | |
| WO | 2008127622 A2 | 10/2008 | |
| WO | 2008127623 A2 | 10/2008 | |

OTHER PUBLICATIONS

U.S. Appl. No. 11/862,938, filed Sep. 27, 2007.
U.S. Appl. No. 11/950,245, filed Dec. 4, 2007.
Sengupta et al., "Data-Parallel GPU Computing," May 31, 2008.
G. Blelloch, Vector Models for Data-Parallel Computing, MIT Press, 1990.
S. Sengupta, M. Harris, Y. Zhang, J. D. Owens, Scan primitives for GPU computing, in: Graphics Hardware 2007, ACM, 2007.
M. Harris, S. Sengupta, J. D. Owens, Parallel prefix sum (scan) with CUDA, in: H. Nguyen (ed.), GNU Gems 3, chap. 39, Addison Wesley, 2007, pp. 851-876.
G. E. Blelloch, Programming parallel algorithms, Commun. ACM 39 (3) (1996) 85-97.
G. E. Blelloch, S. Chatterjee, J. C. Hardwick, J. Sipelstein, M. Zagha, Implementation of a portable nested data-parallel language, Journal of Parallel and Distributed Computing 21 (1) (1994) 4-14.
S. Chatterjee, G. E. Blelloch, M. Zagha, Scan primitives for vector computers, in: Supercomputing '90: Proceedings of the 1990 Conference on Supercomputing, 1990.
P. B. Gibbons, A more practical pram model, in: SPAA '89: Proceedings of the first annual ACM symposium on Parallel algorithms and architectures, ACM, New York, NY, USA, 1989.
J. Hensley, T. Scheuermann, G. Coombe, M. Singh, A. Lastra, Fast summed-area table generation and its applications, Computer Graphics Forum 24 (3) (2005) 547-555.
W. D. Hillis, J. Guy L. Steele, Data parallel algorithms, Commun. ACM 29 (12) (1986) 1170-1183.
D. Horn, Stream reduction operations for GPGPU applications, in: M. Pharr (ed.), GPU Gems 2, chap. 36, Addison Wesley, 2005, pp. 573-589.
K. E. Iverson, A Programming Language, Wiley, New York, 1962.
E. Lindholm, J. Nickolls, S. Oberman, J. Montrym, NVIDIA Tesla: A unified graphics and computing architecture, IEEE Micro 28 (2) (2008) 39-55.
Y. D. N. K. G. P.-P. S. C. B. J. Manferdelli, Fast scan algorithms on graphics processors, in: Proc. Int'l Conference on Supercomputing, ACM, 2008. 27.
J. Nickolls, I. Buck, M. Garland, K. Skadron, Scalable parallel programming with CUDA, Queue 6 (2) (2008) 40-53.
NVIDIA Corporation, NVIDIA CUDA Programming Guide, version 1.1 (Nov. 2007).
J. T. Schwartz, Ultracomputers, ACM Transactions on Programming Languages and Systems 2 (4) (1980) 484-521.
S. Sengupta, A. E. Lefohn, J. D. Owens, A work-efficient step-efficient prefix sum algorithm, in: Proceedings of the Workshop on Edge Computing Using New Commodity Architectures, 2006.
J. A. Stratton, S. S. Stone, W. mei Hwu, M-CUDA: An efficient implementation of CUDA kernels on multi-cores, IMPACT Technical Report IMPACT-08-01, UIUC (Feb. 2008).
Chinese Office Action from Application No. 200810172720.0 dated Apr. 8, 2011.
Chinese Office Action from Application No. 200810145892.9 dated Apr. 15, 2010.
Chinese Office Action from Application No. 200810172720.0 dated Jun. 25, 2010.
German Office Action from Application No. 10-2008-031998.8 dated Mar. 9, 2010.
Notice of Reasons for Rejection from Japanese Application No. 2008263158 dated Jun. 8, 2010.
Notice of Final Rejection from Japanese Application No. 2008263158 dated Nov. 16, 2010.
Notice of Preliminary Rejection from Korean Application No. 10-2008-0113250 dated Dec. 17, 2010.
Notice of Preliminary Rejection from Korean Patent Application No. 10-2008-0113250 dated May 28, 2010.
Notice of Preliminary Rejection from Korean Patent Application No. 10-2008-0094936 dated Feb. 26, 2010.
Advisory Action from U.S. Appl. No. 11/862,938 dated Aug. 23, 2010.
Final Office Action from U.S. Appl. No. 11/862,938 dated Jun. 9, 2010.
Final Office Action from U.S. Appl. No. 11/927,099 dated Jun. 1, 2011.
Final Office Action from U.S. Appl. No. 11/927,159 dated May 26, 2011.
Final Office Action from U.S. Appl. No. 11/938,091 dated Oct. 14, 2010.
Final Office Action from U.S. Appl. No. 11/940,782 dated Sep. 16, 2010.
Final Office Action from U.S. Appl. No. 11/942,608 dated Apr. 29, 2011.
Final Office Action from U.S. Appl. No. 11/942,608 dated May 10, 2010.
Final Office Action from U.S. Appl. No. 11/950,245 dated May 25, 2011.
Non-Final Office Action from U.S. Appl. No. 11/862,938 dated Dec. 1, 2009.
Non-Final Office Action from U.S. Appl. No. 11/927,099 dated Oct. 4, 2010.
Non-Final Office Action from U.S. Appl. No. 11/927,159 dated Sep. 17, 2010.
Non-Final Office Action from U.S. Appl. No. 11/938,091 dated Mar. 2, 2010.
Non-Final Office Action from U.S. Appl. No. 11/940,782 dated May 20, 2010.
Non-Final Office Action from U.S. Appl. No. 11/942,608 dated Nov. 4, 2010.
Non-Final Office Action from U.S. Appl. No. 11/942,608 dated Dec. 18, 2009.
Non-Final Office Action from U.S. Appl. No. 11/950,193 dated Feb. 3, 2011.
Non-Final Office Action from U.S. Appl. No. 11/950,245 dated Oct. 5, 2010.
Advisory Action from U.S. Appl. No. 11/942,608 dated Jul. 18, 2011.
Lauterbach, C. et al., U.S. Appl. No. 11/927,099, filed Oct. 29, 2007.
Lauterbach, C. et al., U.S. Appl. No. 11/927,159, filed Oct. 29, 2007.
Garland, M. et al., U.S. Appl. No. 11/938,091, filed Nov. 9, 2007.
Rajagopalan, N. et al., U.S. Appl. No. 11/942,608, filed Nov. 19, 2007.
Garland, M. et al., U.S. Appl. No. 11/950,193, filed Dec. 4, 2007.
Arvo et al., "Fast Ray Tracing by Ray Classification," ACM, Computer Graphics, Jul. 1987, vol. 21, No. 4, pp. 55-64.
Blelloch, Guy E., "Prefix Sums and Their Applications," Carnegie Mellon University School of Computer Science, Technical Report CMU-CS-90-190, Nov. 1990, pp. 1-23.
Gottschalk et al., "OBBTree: A Hierarchical Structure for Rapid Interference Detection," ACM, Proceedings of the 23rd Annual Conference on Computer Graphics and Interactive Techniques, 1996, vol. 30, pp. 171-180, New York, NY.
Gunther et al., "Realtime Ray Tracing on GPU with BVH-based Packet Traversal," IEEE, Eurographics Symposium on Interactive Ray Tracing 2007, Sep. 10-12, 2007, pp. 1-6.
Havran et al., "Efficient Sorting and Searching in Rendering Algorithms," The Eurographics Association, Version 1.1, Eurographics 2006 Tutorial T4, Aug. 31, 2006, pp. 1-74.
Havran, Vlastimil, "Heuristic Ray Shooting Algorithms," Dissertation Thesis, Nov. 30, 2000, pp. i-xiv, 1-206, Prague.
Horn et al., "Interactive k-D Tree GPU Raytracing," ACM, Proceedings of the 2007 Symposium on Interactive 3D Graphics and Games, 2007, pp. 167-174, New York, NY.
Kamel et al., "On Packing R-Tress," Carnegie Mellon University School of Computer Science, 1993, pp. 1-20.

Miyashita et al., "An Algorithm for Computing Prefix Sum on a Reconfigurable Array,"Academic Journal, Transactions of the Iinstitute of Electronics, Information and Communication Engineers (IEICE) D-I, Jun. 8, 2010, vol. J77-D-I, No. 10, pp. 703-711, Japan.

Naishlos et al., "Towards a First Vertical Prototyping of an Extremely Fine-Grained Parallel Programming Approach," ACM, Proceedings of the Thirteenth Annual ACM Symposium on Parallel Algorithms and Architectures, 2001, pp. 93-102, New York, NY.

Pascucci et al., "Global Static Indexing for Real-Time Exploration of Very Large Regular Grids," ACM, Nov. 2001, pp. 1-8.

Popov et al., "Stackless KD-Tree Traversal for High Performance GPU Ray Tracing," Eurographics 2007, The Eurographics Association and Blackwell Publishing, 2007, vol. 26, No. 3, pp. 415-424.

Reshetov et al., "Multi-Level Ray Tracing Algorithm," ACM Transactions on Graphics (TOG)-Proceedigns of ACM SIGGRAPH 2005, Jul. 2005, vol. 24, Issue 3, pp. 1176-1185, New York, NY.

Roger et al. "Whitted Ray-Tracing for Dynamic Scenes using a Ray-Space Hierarchy on the GPU," Eurographics Symposium on Rendering, Jun. 2007, pp. 99-110.

Sato et al., "Implementing the PRAM Algorithms in the Multithread Architecture and Evaluating the Performance," Information Processing Society of Japan (IPSJ), SIG Notes '98 (28), Mar. 20, 1998, pp. 39-46, Japan.

Thinking Machines Corporation, Connection Machine Model CM-2 Technical Summary, Version 6.0, Nov. 1990, pp. iii-vii and pp. 1-110 USA.

Wachter, C. et al., Instant Ray Tracing: The Bounding Interval Hierarchy, Eurographics Symposium on Rendering (2006), The Eurographics Association, 2006, pp. 139-149, Germany.

Wald et al, "Interactive Rendering with Coherent Ray Tracing," Computer Graphics Forum, vol. 20 (2001), No. 3, Eurographics 2001, pp. 153-164.

Wald, Ingo, "On Fast Construction of SAH-based Bounding Volume Hierarchies," IEEE Symposium on Interactive Ray Tracing, 2007, pp. 33-40, IEEE Computer Society, Washington DC.

Wald, I., "Realtime Ray Tracing and Interactive Global Illumination," Dissertation Thesis, Jan. 21, 2004, pp. iii-xiv and pp. 3-297, Germany.

Wald et al., "SIMD Ray Stream Tracing—SIMD Ray Traversal with Generalized Ray Packets and On-the-fly Re-Ordering," SCI Institute Technical Report, UUSCI-2007-012, Aug. 2, 2007, pp. 1-8, Salt Lake City, Utah.

Yoon, S. E. et al., Cache-Oblivious Mesh Layouts, ACM Transaction on Graphics, SIGGRAPH 2005, Apr. 28, 2005, pp. 886-893 USA.

Zagha, M. et al., Radix Sort for Vector Multiprocessors, Proceedings of the 1991 ACM/IEEE Conference on Supercomputing, Nov. 1991, pp. 712-721, New York, NY, USA.

Final Office Action from U.S. Appl. No. 11/950,193 dated Jul. 22, 2011.

Examiner's Answer from U.S. Appl. No. 11/862,938, dated Aug. 17, 2011.

Notice of Allowance from U.S. Appl. No. 11/938,091, dated Aug. 24, 2011.

Advisory Action from U.S. Appl. No. 11/950,193, dated Oct. 3, 2011.

Advisory Action from U.S. Appl. No. 11/950,245, dated Aug. 16, 2011.

Non-Final Office Action from U.S. Appl. No. 12/333,255, dated Oct. 11, 2011.

Notice of Allowance from U.S. Appl. No. 11/927,159, dated May 10, 2012.

Notice of Allowance from U.S. Appl. No. 12/333,255, dated Apr. 11, 2012.

Office Action from Chinese Patent Application No. 200810172720.0, dated Sep. 23, 2011.

Notice of Allowance from U.S. Appl. No. 11/927,099, dated Jun. 27, 2012.

Office Action from Taiwan Patent Application No. 097143617, dated Jul. 16, 2012.

* cited by examiner

SYSTEM, METHOD, AND COMPUTER PROGRAM PRODUCT FOR CONVERTING A REDUCTION ALGORITHM TO A SEGMENTED REDUCTION ALGORITHM

FIELD OF THE INVENTION

The present invention relates to reduction algorithms, and more particularly to converting reduction algorithms to segmented reduction algorithms.

BACKGROUND

A sparse matrix is a matrix populated primarily with zeros. Sparse matrix multiplication is a useful tool in many computing applications. For example, in the context of graphics processing, it is often useful to multiply a sparse matrix by a dense vector, such as when implementing iterative solvers for systems of linear equations. In these cases, reduction operations are useful for performing such multiplications.

Applications such as sparse matrix-vector multiplication implemented using reduction operations are often difficult to map to data-parallel machines (e.g. graphics processing units, etc.) because of the unequal workload distribution caused when mapping rows of the matrix onto processing elements. There is thus a need for addressing these and/or other issues associated with the prior art.

SUMMARY

A system, method, and computer program product are provided for converting a reduction algorithm to a segmented reduction algorithm. In operation, a reduction algorithm is identified. Additionally, the reduction algorithm is converted to a segmented reduction algorithm. Furthermore, the segmented reduction algorithm is performed to produce an output.

DETAILED DESCRIPTION

Figure 1:
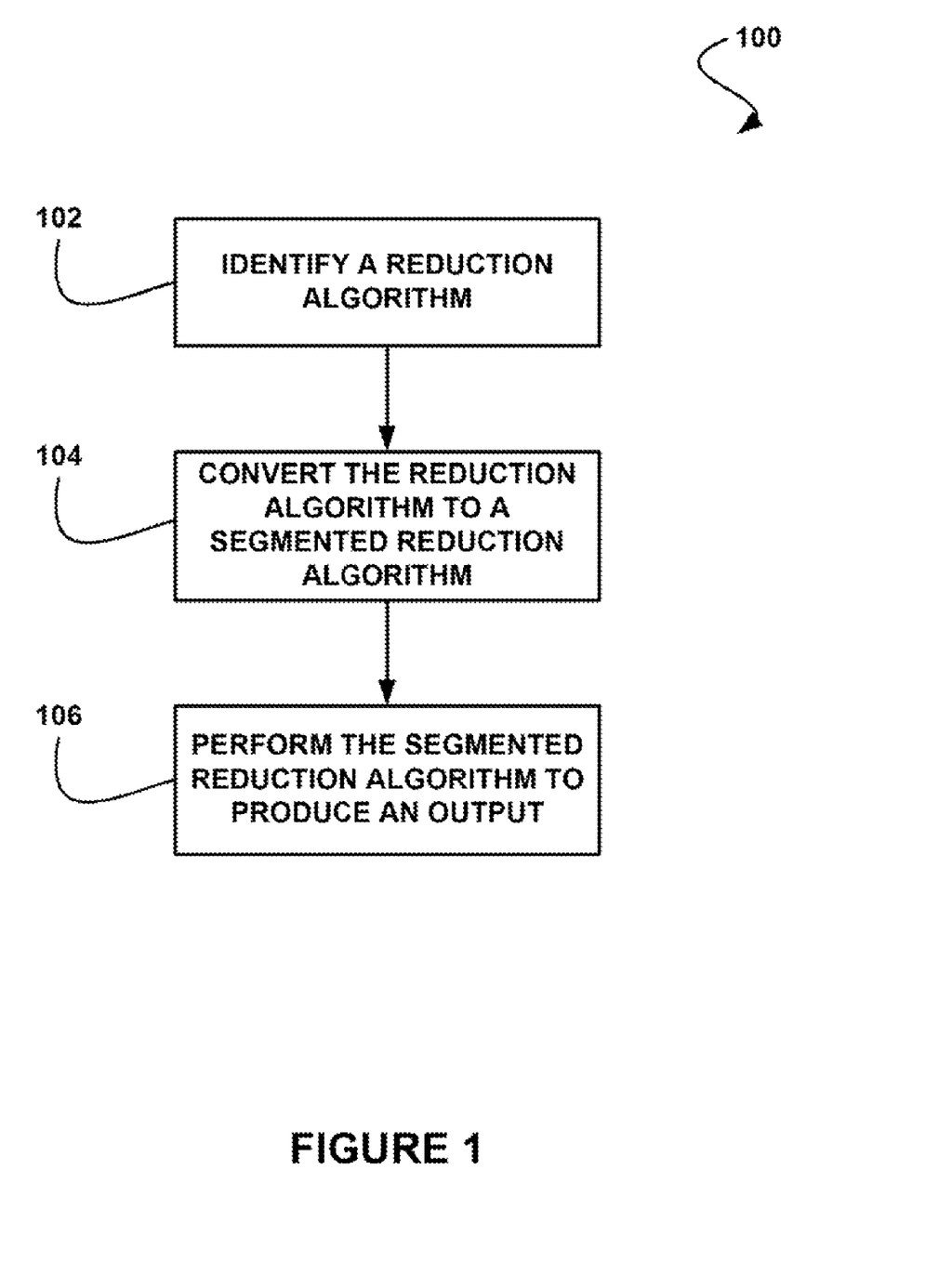
FIG. 1 shows a method for converting a reduction algorithm to a segmented reduction algorithm, in accordance with one embodiment.

FIG. 1 shows a method 100 for converting a reduction algorithm to a segmented reduction algorithm, in accordance with one embodiment. As shown, a reduction algorithm is identified. See operation 102.

In the context of the present description, a reduction algorithm refers to any algorithm capable of reducing an array or input vector by repeated application of an operation that produces a single result from two input values. For example, in one embodiment, the reduce algorithm may include an algorithm that collects data from elements in an array or vector and performs an operation such as a sum operation, a min operation, or a max operation, etc. on the collected data.

Additionally, the reduction algorithm may include a forward reduction algorithm or a backward reduction algorithm. In this case, a forward reduction algorithm refers to any reduction algorithm that operates from left to right across an array or sequence of values. A backward reduction algorithm refers to any reduction algorithm that operates from right to left across an array or sequence of values.

Furthermore, the reduction algorithm is converted to a segmented reduction algorithm. See operation 104. In the context of the present description, a segmented reduction algorithm refers to any reduction algorithm capable of performing reductions on arbitrary partitions (e.g. segments, etc.) of an input vector, array, or other data structure.

The segmented reduction algorithm may include a forward segmented reduction algorithm or a backward segmented reduction algorithm. Furthermore, in various embodiments, the reduction algorithm may be converted to a segmented reduction algorithm utilizing different techniques. For example, in one embodiment, the conversion may be performed utilizing computer code embodied on a computer readable medium (e.g. a software driver, etc.).

In another embodiment, the conversion may be performed utilizing hardware. In this case, the hardware may include a parallel architecture. For example, the hardware may include a graphics processor and/or a central processing unit (CPU) capable of parallel processing.

Still yet, the segmented reduction algorithm is performed to produce an output. See operation 106. It should be noted that the segmented reduction algorithm may be performed on a plurality of elements of an array in parallel. Furthermore, the segmented reduction algorithm may be performed for avoiding a full segmented scan.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
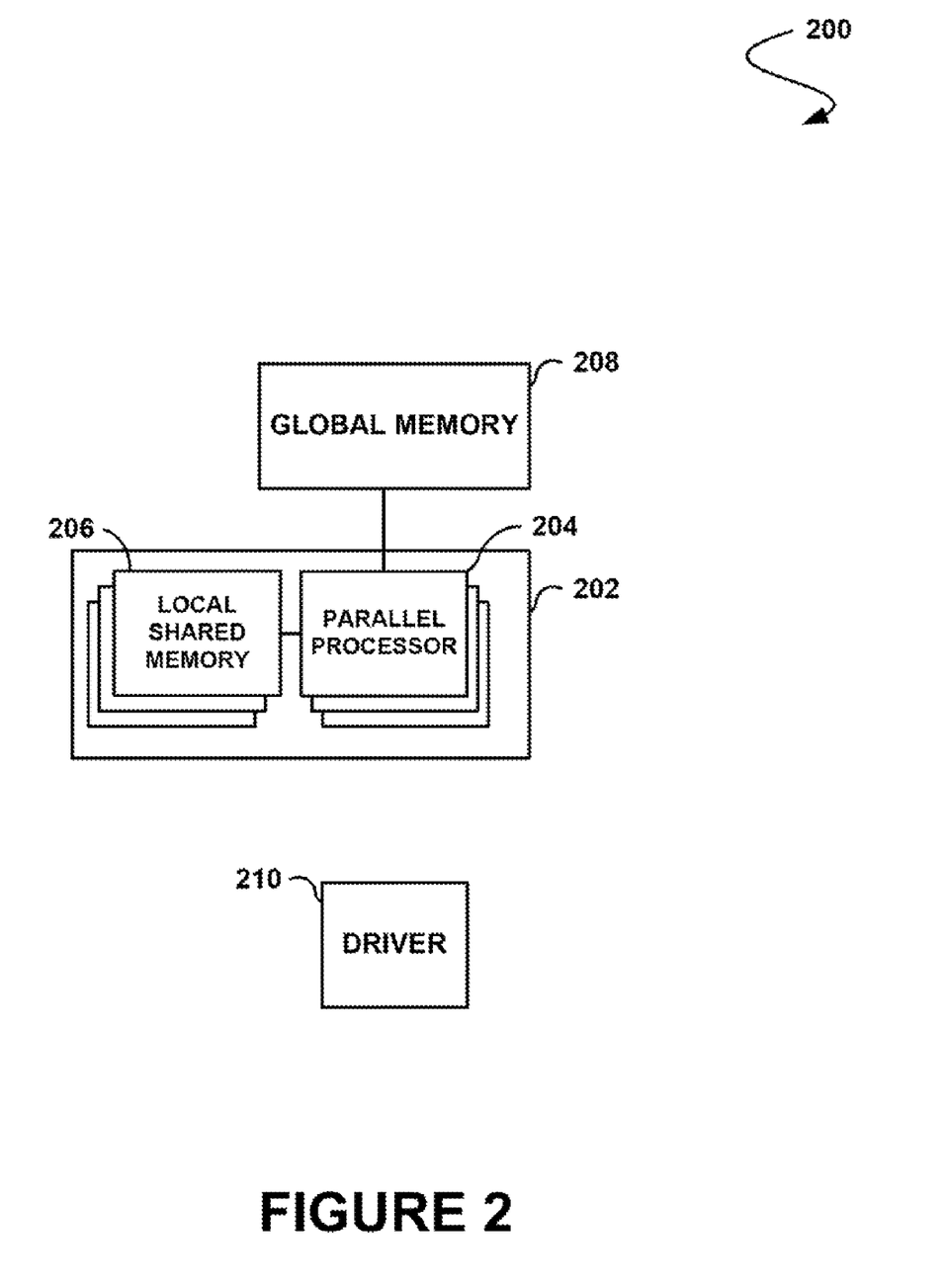
FIG. 2 shows a system for converting a reduction algorithm to a segmented reduction algorithm, in accordance with one embodiment.

FIG. 2 shows a system 200 for converting a reduction algorithm to a segmented reduction algorithm, in accordance with one embodiment. As an option, the present system 200 may be implemented to carry out the method 100 of FIG. 1. Of course, however, the present system 200 may be implemented in any desired environment. It should also be noted that the aforementioned definitions may apply during the present description.

As shown, a parallel processing architecture 202 is provided. Such parallel processing architecture 202 includes a plurality of parallel processors 204. While not shown, such parallel processors 204 may be capable of operating on a predetermined number of threads. To this end, each of the parallel processors 204 may operate in parallel, while the corresponding threads may also operate in parallel.

In one embodiment, the parallel processing architecture 202 may include a SIMD architecture. In such a system, the threads being executed by the processor are collected into groups such that at any instant in time all threads within a single group are executing precisely the same instruction but on potentially different data. In one embodiment, this group of threads operating in such fashion may be referred to as a "warp." Further, the predetermined number of threads may refer to the "warp size" of the corresponding processor.

In another embodiment, the foregoing parallel processing architecture 202 may include a graphics processor or any other integrated circuit equipped with graphics processing capabilities [e.g. in the form of a chipset, system-on-chip (SOC), core integrated with a CPU, discrete processor, etc.]. In still another embodiment, the foregoing parallel processing architecture 202 may include a processor with one or more vector processing elements such as the STI Cell Broadband Engine microprocessor architecture.

With continuing reference to FIG. 2, the parallel processing architecture 202 includes local shared memory 206. Each of the parallel processors 204 of the parallel processing architecture 202 may read and/or write to its own local shared memory 206. This shared memory 206 may consist of physically separate memories associated with each processor 204 or it may consist of separately allocated regions of one or more memories shared amongst the processors 204. Further, in the illustrated embodiment, the shared memory 206 may be embodied on an integrated circuit on which the processors 204 of the parallel processing architecture 202 are embodied.

Still yet, global memory 208 is shown to be included. In use, such global memory 208 is accessible to all the processors 204 of the parallel processing architecture 202. As shown, such global memory 208 may be embodied on an integrated circuit that is separate from the integrated circuit on which the processors 204 of the aforementioned parallel processing architecture 202 are embodied. While the parallel processing architecture 202 is shown to be embodied on the various integrated circuits of FIG. 2 in a specific manner, it should be noted that the system components may or may not be embodied on the same integrated circuit, as desired.

Still yet, the present system 200 of FIG. 2 may further include a driver 210 for controlling the parallel processing architecture 202, as desired. In one embodiment, the driver 210 may include a library, for facilitating such control. For example, such library may include a library call that may instantiate the functionality set forth herein. Further, in another embodiment, the driver 210 may be capable of providing general computational capabilities utilizing the parallel processing architecture 202 (e.g. a graphics processor, etc.). An example of such a driver 210 may be provided in conjunction with the CUDA™ framework provided by NVIDIA Corporation. In operation, the driver 210 may be used for converting, or to control the system 200 to convert, a reduction algorithm to a segmented reduction algorithm.

Segmented reduction generalizes the reduction primitive by allowing reductions on arbitrary partitions (e.g. segments, etc.) of an input vector. Segments may be demarcated by flags, where a set flag marks the first element of a segment. Segmented reduce is useful as a building block for multiplying a sparse matrix by a dense vector, which is a core operation in most sparse solvers. Accordingly, in one embodiment, the segmented reduction algorithm may be performed in connection with a sparse matrix-dense vector multiplication operation.

In some cases, applications such as sparse matrix-vector multiplication are difficult to map to data-parallel machines (e.g. GPUs, etc.) because of unequal workloads. In these applications, processing may be performed in parallel on multiple segments of unequal length. If each thread of a parallel processing architecture processes one such segment, a work imbalance between threads may occur.

A segmented reduction operation allows the reduction of segments to be performed by potentially many processing elements in parallel, thus avoiding the work imbalance of assigning each segment to a single processing element. Moreover, the running time of such operation is dependent on the length of the input vector and not on the number of segments or their length.

In some cases, sparse matrix-vector multiplication may also be implemented by using a segmented scan. In contrast to segmented reduction, which computes the sum of all elements for each segment, a segmented scan produces the set of all partial sums across each segment.

Computing the sum of all elements for each segment is sufficient for computations such as sparse matrix-vector multiplication. In other words, the last element (or beginning element, depending on the direction of data movement) produced by the segmented scan in each segment is all that is needed for such computations. Thus, a segmented reduce that only computes the required values may be utilized, and may be more efficient since it performs less work.

To implement the segmented reduce operation, an array may be divided into groups of elements that may each be reduced by a single thread block (e.g. one or more threads, etc.). For example, if an input array of N elements is provided, the array may be divided into N/B blocks of B/2 threads each, where B is the total number of blocks. In this example, it is assumed that N is a multiple of B.

A segmented reduce is then performed on each of these N/B blocks in parallel. The last data element of each block may then be written to an auxiliary array "SUMS." Similarly, the last flag element for the block may be written to another auxiliary array "FLAGS." In this case, the last flag element is the logical OR of all the flags in that block.

Finally, the index of the leftmost flag in that block may be written to a minimum limit index data structure "MIN_INDICES." In order to create this limit index data structure, a vector of data and a vector of flags the same length as the data vector may be provided to each block. In this case, a block refers to a group of threads or processing elements.

In the vector of flags, a flag is set to "1" for an element if an element in the corresponding data vector is a segment head. Alternatively, the flag vector element is set to "0" if an element in the corresponding data vector is not a segment head.

Thus, the segmented reduction algorithm may be performed utilizing an index data structure, where the index data structure may include an index of a last element in a subset of an array, or an index of a first element in a subset of an array, depending on a direction of the reduction operation. Furthermore, the segmented reduction algorithm may be performed utilizing at least one head flag capable of indicating the start of segments.

As an example, if a sequence "a" is segmented into subsequences, where a=[[3 1] [7 0 4] [1 6 3]], "a" may be represented as an array of values and an array of head flags. In this case, a head flag of "1" may be used to indicate the start of a new subsequence. Table 1 shows an array of values and an array of head flags, in accordance with this example.

TABLE 1

| a. values | [3 1 7 0 4 1 6 3] |
|---|---|
| a. flags | [1 0 1 0 0 1 0 0] |

It should be noted that other representations of the segmentation may also be utilized. For instance, in one embodiment, a corresponding subsequence count may be recorded for each element.

Using this flag vector (e.g. a.flags, etc.) an index vector may be constructed, where an element is set to an index of the element-1 if the head flag to the right of that element is set, or to a default value (e.g. UINT_MAX, etc.) if otherwise. An inclusive backward minimum scan may then be performed on this vector.

Thus, for each element in the input, the corresponding element in the index vector is the index of the last element of that segment. From this index vector, "index," a value may be generated for the limit data structure for the $i^{th}$ block, MIN_INDICES[i]. In this case, MIN_INDICES[i] is equal to index[0]+1, where index[0] is the first element of the index vector of that block.

For the $i^{th}$ block, three values are written to SUMS[i], FLAGS[i], and MIN_INDICES[i] respectively. Thus, the arrays SUMS, FLAGS, and MIN_INDICES have N/B elements. An inclusive segmented scan is then performed on the SUMS array with the flags in the FLAGS array. More information regarding the performance of the inclusive segmented scan may be found in U.S. patent Ser. No. 11/950,245, filed Dec. 4, 2007, under the title "SYSTEM, METHOD, AND COMPUTER PROGRAM PRODUCT FOR CONSTRUCTING A PROCEDURE CAPABLE OF PERFORMING A SEGMENTED SCAN OPERATION ON A SEQUENCE OF ELEMENTS OF ARBITRARY LENGTH," which is incorporated herein by reference in its entirety.

Once the inclusive segmented scan is performed, an add kernel may be invoked to add the elements of the SUMS array to the N/B blocks on which the segmented scan was performed in parallel. In this case, a uniform add may be implemented. Information regarding the uniform add may be found in U.S. patent application Ser. No. 11/862,938, filed Sep. 27, 2007, under the title "SYSTEM, METHOD AND COMPUTER PROGRAM PRODUCT FOR PERFORMING A SCAN OPERATION," which is incorporated herein by reference in its entirety.

As a result of the uniform add, SUMS[i] is added to all the elements of the first segment in the $(i+1)^{th}$ block, ranging from the second block to the last block. In the case of an un-segmented scan, this add may occur on all the elements of the block, as the segment may be viewed as spanning an entire block. To determine the extent of the first segment in each block, the MIN_INDICES array may be utilized.

The MIN_INDICES array has, for each block, the index of the leftmost flag in that block. Thus, the uniform add kernel only adds SUMS[i] to those elements of the $(i+1)^{th}$ block whose indices are less than that in MIN_INDICES[i].

In this way, a segmented reduce may be performed on all blocks in parallel. A second level inclusive segmented scan with a block level reduce of data and flags may then be performed. Furthermore, the results of the segmented scan may be added back into the corresponding blocks output from the reduce that was performed in parallel. It should be noted that the addition is only performed to the first or last segment in that block, depending on the direction of the scan.

A second level inclusive segmented scan with a block level reduce of data and flags may then be performed and the results of the segmented scan may be added back into the corresponding blocks output from the reduce that was performed in parallel. More information regarding this data flow may be found in U.S. patent Ser. No. 11/950,245, filed Dec. 4, 2007, under the title "SYSTEM, METHOD, AND COMPUTER PROGRAM PRODUCT FOR CONSTRUCTING A PROCEDURE CAPABLE OF PERFORMING A SEGMENTED SCAN OPERATION ON A SEQUENCE OF ELEMENTS OF ARBITRARY LENGTH," which has been incorporated by reference in its entirety.

It should be noted that a further down-sweep may be needed to obtain the correct value at every position. In this case, the down-sweep may include any computation that uses results (e.g. partial sums, etc.) computed by the reduction operation to build a final scan result in place on the array. Table 2 shows code for performing a forward segmented reduction, in accordance with one embodiment.

TABLE 2

```
if (index[ai] == index[bi])
{
    data[bi] = data[bi] + data[ai]);
}
else
{
    int seg_last_idx = index[ai];
    if (seg_last_idx ! = ai)
    {
        data[seg_last_idx] = data[seg_last_idx] + data[ai];
    }
}
// OR-reduce of flags
flags[bi] = flags[bi] | flags[ai];
```

With respect to the code shown in Table 2, since index[i] has the index of the last element of each segment, it is determined whether index[ai] and index[bi] are the same. If they are the same, data[ai] and data[bi] are in the same segment and these values are added. If index[ai] and index[bi] are not the same, data[ai] is added to the last element in its segment whose index is index[ai]. It is also verified that "ai" is not the index of the last element of its own segment. It should be noted that, in this case, there is not a need for a min-reduce since MIN_INDICES[i] may be calculated for each $i^{th}$ block from the index vector.

In another embodiment, a backward segmented reduction algorithm may be implemented. In other words, the segmented reduce may be implemented utilizing an "add-to-the-left" addition pattern rather than an "add-to-the-right" addition pattern shown in the reduce step. This may be accomplished by setting "ai" to a thread Id value and "bi" to the thread Id value+1 before the start of the log n steps of the reduce operation.

At the end of each reduce step, "ai" and "bi" are multiplied by 2. The index vector calculation for the backward segmented reduction is implemented differently than the forward segmented reduction. From the flag vector, an index vector may be constructed that is set to the index of the element, if the head flag for that element is set or 0. An inclusive maximum scan may be performed on this vector. Thus, for each element in the input, the corresponding element in the index vector is the index of the first element of that segment.

Instead of using the minimum limit data structure MIN_INDICES, as in the forward segmented reduction, a maximum limit data structure such as a MAX_INDICES vector, may be utilized, where MAX_INDICES[i] includes the index of the starting position of the last segment for the $i^{th}$ block. In this case, MAX_INDICES[i] is equal to index[lastIdx], where index[lastIdx] is the last element of the index vector of that block.

For the $i^{th}$ block, three values are written to SUMS[i], FLAGS[i], and MAX_INDICES[i] respectively. In this case, the arrays SUMS, FLAGS, and MAX_INDICES have N/B elements. An inclusive backward segmented scan is then performed on the SUMS array with the flags in the FLAGS array. Furthermore, an add kernel is invoked to add the elements of SUMS to the N/B blocks on which the segmented scan had been performed in parallel.

Similar to the forward segmented reduce operation, this is a uniform add. In this case, SUMS[i+1] is added to all the elements of the last segment in the (i)$^{th}$ block, ranging from the first block to the second last block. In the case of unsegmented scan, this may occur to all the elements of the block since the segment may be viewed as spanning an entire block. To find out the extent of the last segment in each block, the MAX_INDICES array may be utilized. The MAX_INDICES array has, for each block, the index of the rightmost flag in that block. Thus, the uniform add kernel only adds SUMS[i] to those elements of the (i+1)$^{th}$ block whose indices are greater than or equal to that in MAX_INDICES[i].

Table 3 shows code for performing a backward segmented reduction, in accordance with one embodiment.

TABLE 3

```
if (index[ai] == index[bi])
{
    data[ai] = data[ai] + data[bi]);
}
else
{
    int seg_first_idx = index[bi];
    if (seg_first_idx != bi)
    {
        data[seg_first_idx] = data[seg_first_idx] + data[bi];
    }
}
// OR-reduce of flags
flags[ai] = flags[ai] | flags[bi];
```

With respect to the code shown in Table 3, since index[i] has the index of the first element of each segment, it is determined whether index[ai] and index[bi] are the same. If they are the same, data[ai] and data[bi] are in the same segment and these values are added. If index[ai] and index[bi] are not the same, data[bi] is added to the first element in its segment whose index is index[bi]. It is also verified that "bi" is not the index of the first element of its own segment. Using these techniques, the correct reduce values may be located at the last indices or the first indices, depending on the direction of the segmented reduce, of each segment without the need for any down-sweep.

Figure 3:
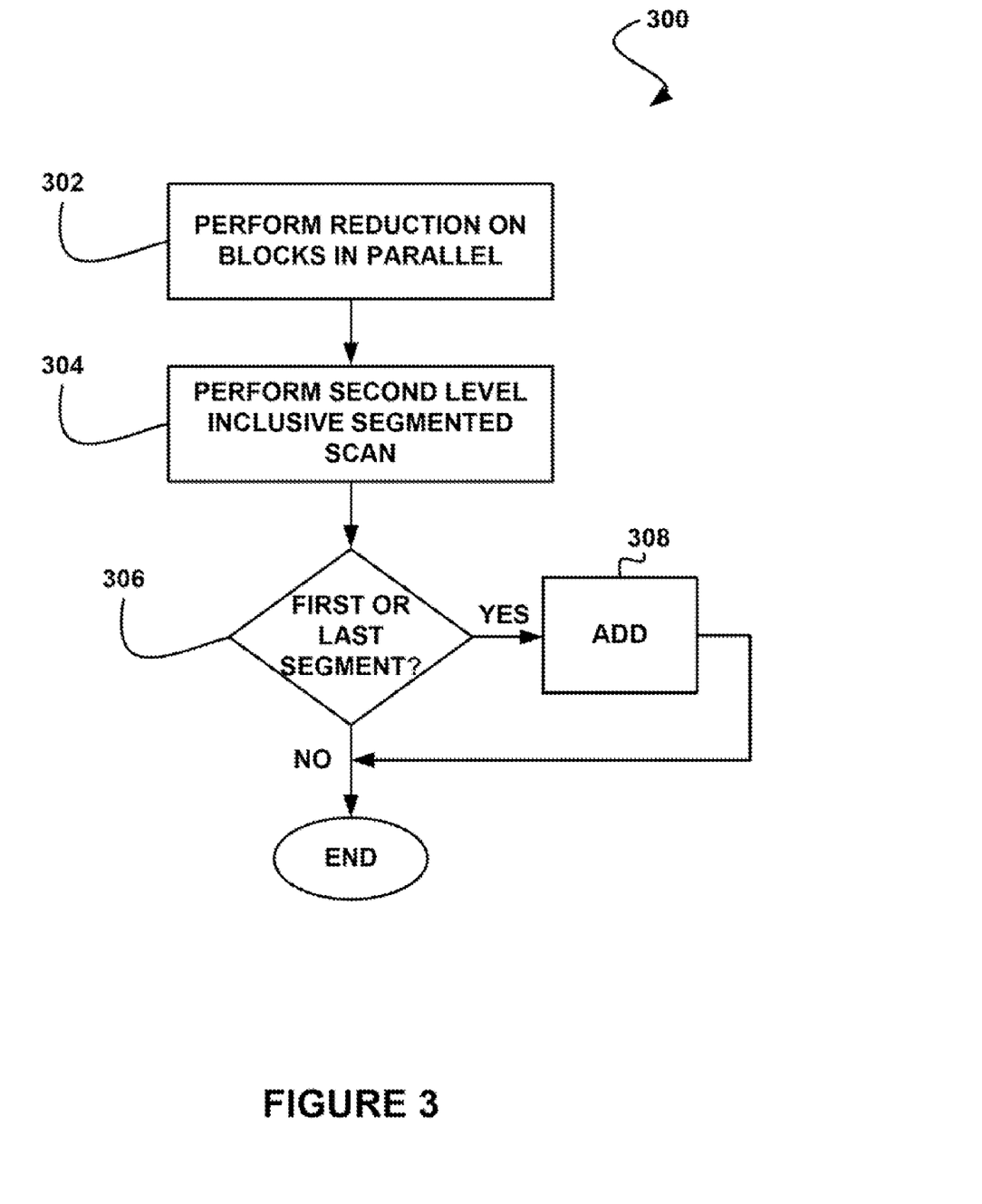
FIG. 3 shows a method for converting a reduction algorithm to a segmented reduction algorithm, in accordance with another embodiment.

FIG. 3 shows a method 300 for converting a reduction algorithm to a segmented reduction algorithm, in accordance with another embodiment. As an option, the present method 300 may be implemented in the context of the functionality and architecture of FIGS. 1-2. Of course, however, the method 300 may be carried out in any desired environment. Again, the aforementioned definitions may apply during the present description.

As shown, a segmented reduction algorithm is performed on a plurality of blocks in parallel. See operation 302. In the context of the present description, a block refers to any contiguous group of elements in an array. Thus, the segmented reduction algorithm may be performed on a plurality of elements of an array, in parallel.

A second level inclusive segmented scan with block level reduce of data and flags is then performed. See operation 304. It is then determined whether a segment is a first or last segment in a block. See operation 306.

If the segment is the first segment in a block and a forward segmented reduce of the data is being performed, the results of the segmented scan in operation 302 are added back into to the corresponding blocks of the output from operation 304. See operation 308. Similarly, if the segment is the last segment in a block and a backward segmented reduce of the data is being performed, the results of the segmented scan in operation 302 are added back into to the corresponding blocks of the output from operation 304. It should be noted that the addition only happens to the first or last segment in that block.

Figure 4:
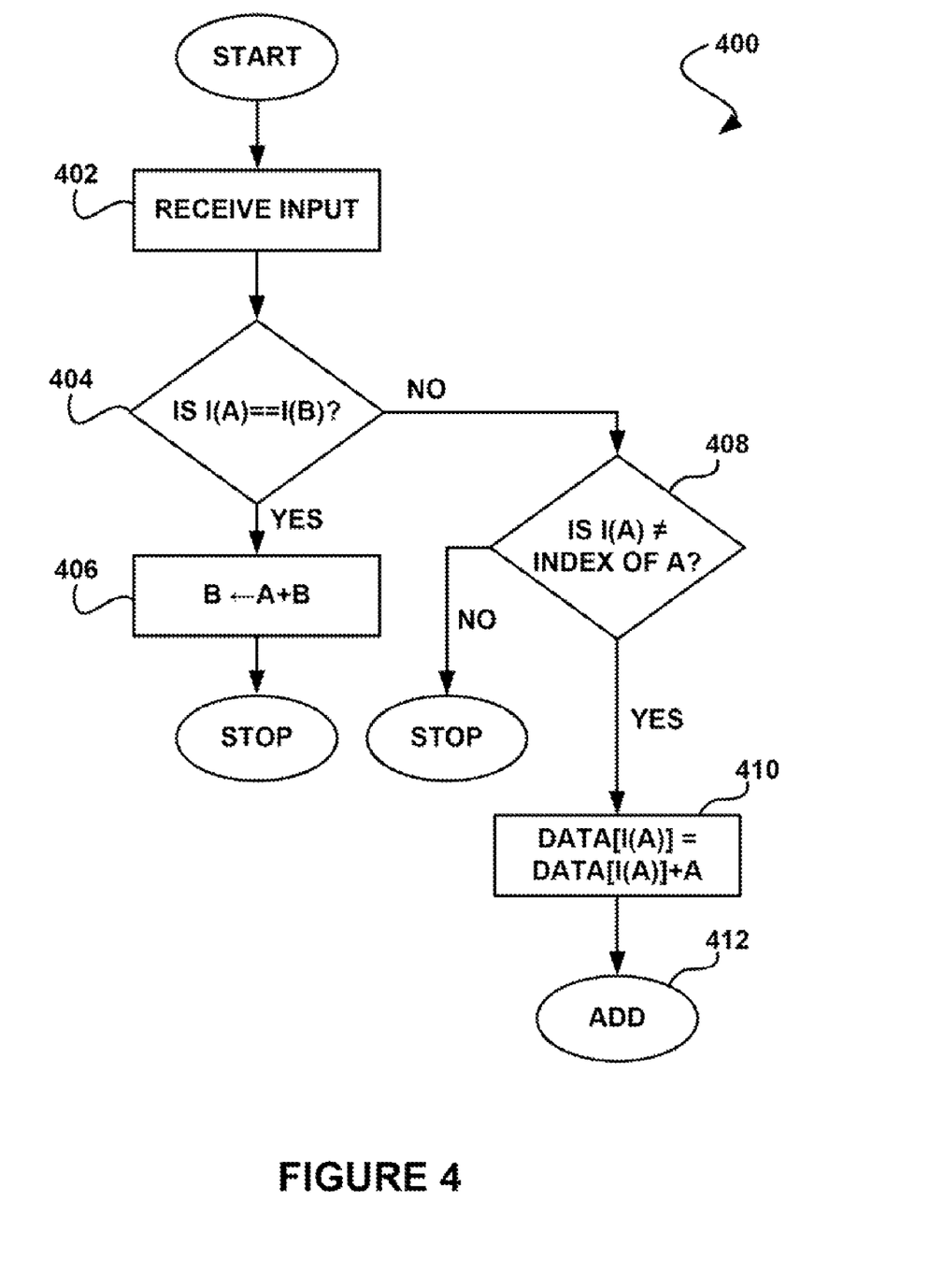
FIG. 4 shows a method for converting a reduction algorithm to a segmented reduction algorithm, in accordance with another embodiment.

FIG. 4 shows a method 400 for converting a reduction algorithm to a segmented reduction algorithm, in accordance with another embodiment. As an option, the present method 400 may be implemented in the context of the functionality and architecture of FIGS. 1-3. Of course, however, the method 400 may be carried out in any desired environment. Furthermore, the aforementioned definitions may apply during the present description.

As shown, an input is received. See operation 402. The input may include an array of values "A" and "B" and index data structures corresponding with the array of values, "I(A)" and "I(B)" respectively. In this case, the index data structure I(A) and I(B) include the index of the last elements in the subsequence of the array of values A and B respectively.

Once the input is received, it is determined whether I(A) is equal to I(B). See operation 404. If it is determined that I(A) is equal to I(B), then the array of values B is set to be equal to the sum of A and B. See operation 406.

If I(A) is determined to be equal to I(B), then it is further determined whether I(A) is equal to the index of A. See operation 408. If it is determined that I(A) is equal to the index of A, then the reduction process is stopped.

If it is determined that I(A) is not equal to the index of A, then a data array DATA is configured such that DATA[I(A)] is equal to DATA[I(A)]+A. See operation 410. DATA[I(A)] is then added to the last element in its segment. See operation 412.

In this way, a segmented reduction may be performed on a fixed byte sequence. This result may then be utilized in conjunction with a segmented scan. More information regarding utilizing the segmented reduction in conjunction with the segmented scan may be found in U.S. patent Ser. No. 11/950,245, filed Dec. 4, 2007, under the title "SYSTEM, METHOD, AND COMPUTER PROGRAM PRODUCT FOR CONSTRUCTING A PROCEDURE CAPABLE OF PERFORMING A SEGMENTED SCAN OPERATION ON A SEQUENCE OF ELEMENTS OF ARBITRARY LENGTH," which has been incorporated by reference in its entirety.

Figure 5A:
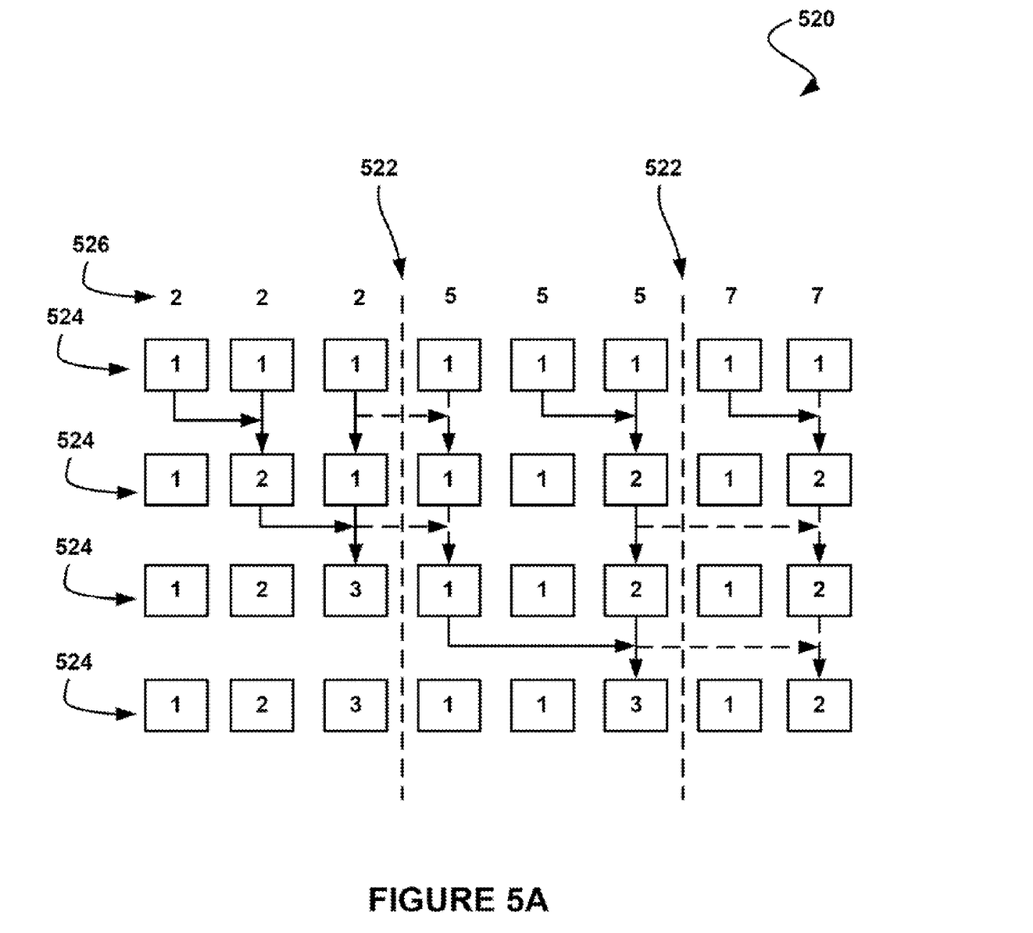
FIG. 5A shows a data flow for performing a forward segmented reduction algorithm, in accordance with another embodiment.

FIG. 5A shows a data flow 520 for performing a forward segmented reduction algorithm, in accordance with another embodiment. As an option, the present data flow 520 may be viewed in the context of the details of FIGS. 1-4. Of course, however, the data flow 520 may be implemented in any desired environment. The aforementioned definitions may apply during the present description.

As shown, a plurality of segment boundaries 522 are provided. Each segment defined by the segment boundary 522 includes one or more elements 524. In this case, the solid arrows indicate data movement from the elements 524 in the segments when performing a segmented reduce. The dotted arrows show data movement in absence of any segments. The array of numbers 526 indicates an index of the last element of the segment. The array of numbers 526 may correspond to the index vector, for example.

Figure 5B:
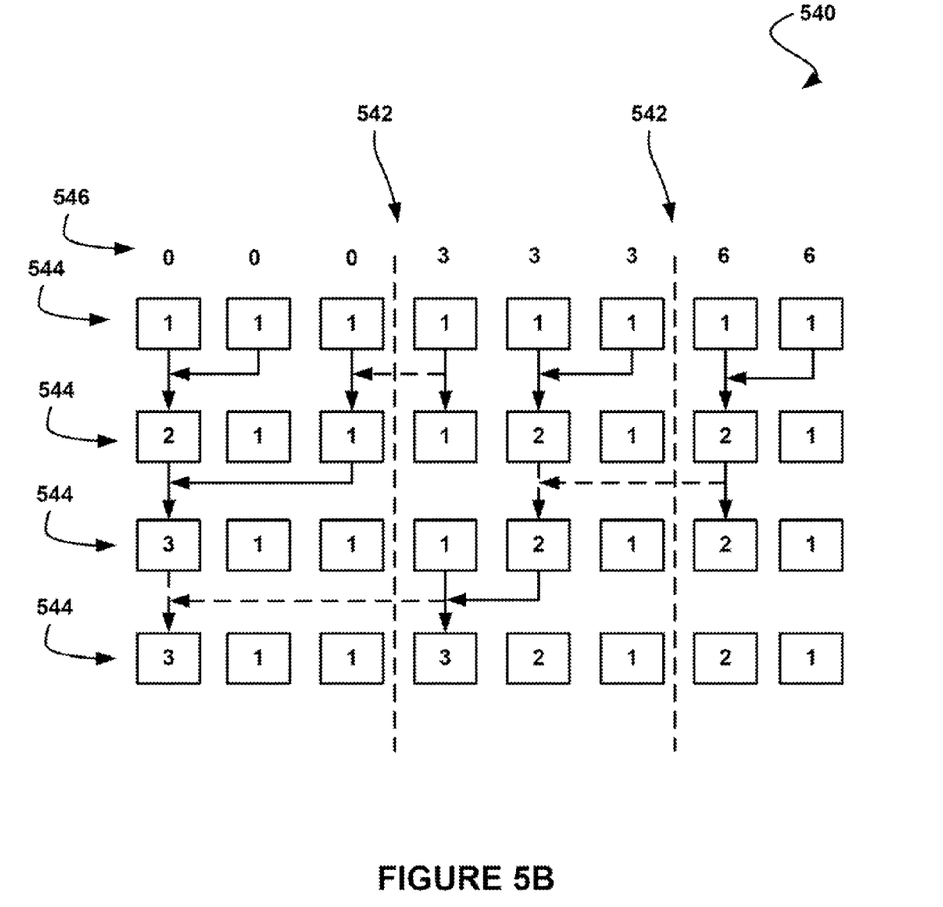
FIG. 5B shows a data flow for performing a backward segmented reduction algorithm, in accordance with one embodiment.

FIG. 5B shows a data flow 540 for performing a backward segmented reduction algorithm, in accordance with one embodiment. As an option, the present data flow 540 may be viewed in the context of the details of FIGS. 1-5A. Of course, however, the data flow 540 may be implemented in any desired environment. Furthermore, the aforementioned definitions may apply during the present description.

As shown, a plurality of segment boundaries 542 are provided. Each segment defined by the segment boundary 542 includes one or more elements 544. In this case, the solid arrows indicate data movement from the elements 544 in the segments when performing a segmented reduce. The dotted arrows show data movement in absence of any segments. The array of numbers 546 indicates an index of the segment head. The array of numbers 546 may correspond to the index vector, for example.

Figure 6:
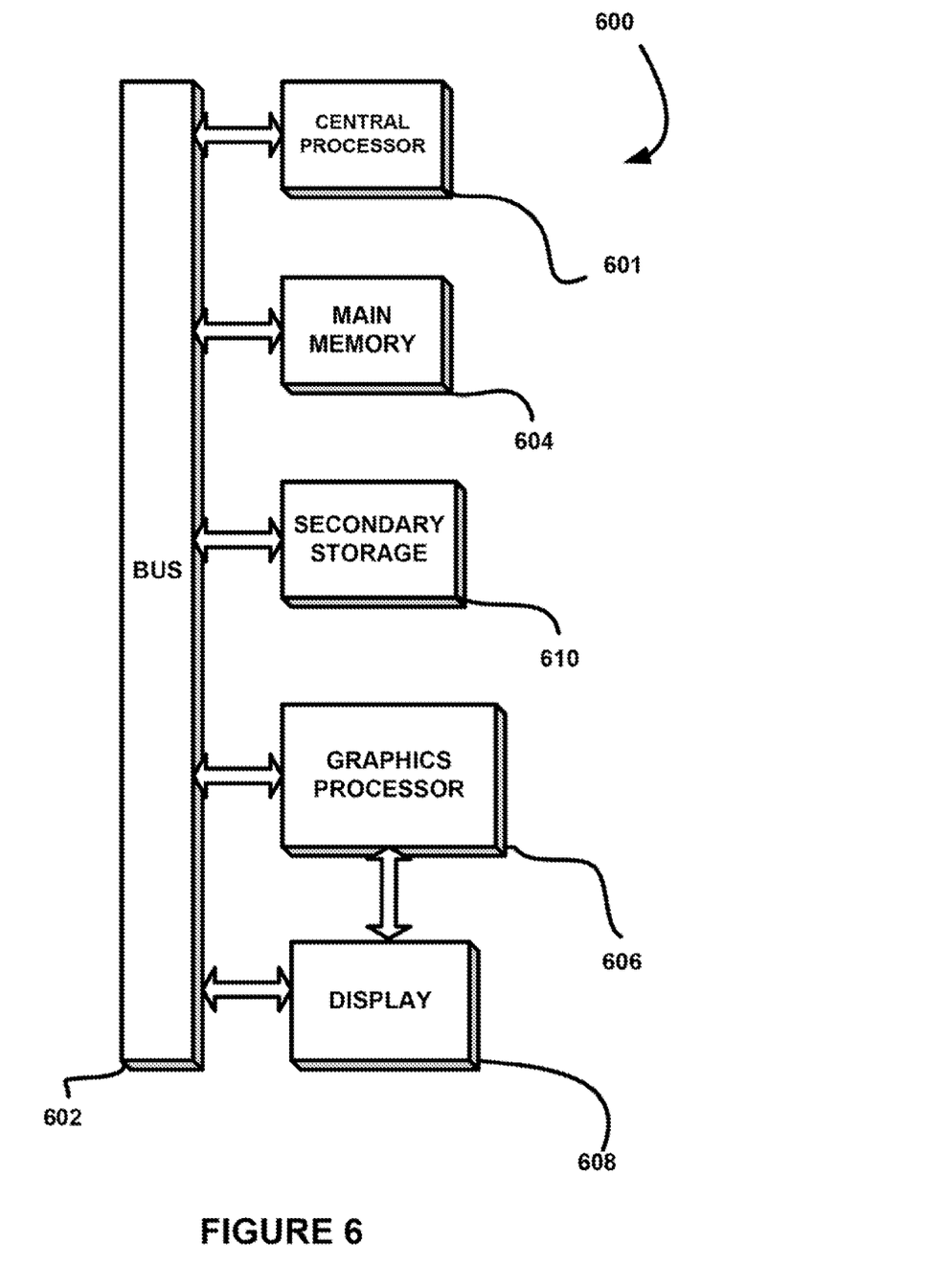
FIG. 6 illustrates an exemplary system in which the various architecture and/or functionality of the various previous embodiments may be implemented.

FIG. 6 illustrates an exemplary system 600 in which the various architecture and/or functionality of the various previous embodiments may be implemented. As shown, a system 600 is provided including at least one host processor 601 which is connected to a communication bus 602. The system 600 also includes a main memory 604. Control logic (software) and data are stored in the main memory 604 which may take the form of random access memory (RAM).

The system 600 also includes a graphics processor 606 and a display 608, i.e. a computer monitor. In one embodiment, the graphics processor 606 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 600 may also include a secondary storage 610. The secondary storage 610 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 604 and/or the secondary storage 610. Such computer programs, when executed, enable the system 600 to perform various functions. Memory 604, storage 610 and/or any other storage are possible examples of computer-readable media.

In one embodiment, the architecture and/or functionality of the various previous figures may be implemented in the context of the host processor 601, graphics processor 606, an integrated circuit (not shown) that is capable of at least a portion of the capabilities of both the host processor 601 and the graphics processor 606, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 600 may take the form of a desktop computer, lap-top computer, and/or any other type of logic. Still yet, the system 600 may take the form of various other devices including, but not limited to, a personal digital assistant (PDA) device, a mobile phone device, a television, etc.

Further, while not shown, the system 600 may be coupled to a network [e.g. a telecommunications network, local area network (LAN), wireless network, wide area network (WAN) such as the Internet, peer-to-peer network, cable network, etc.) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
identifying a reduction algorithm;
converting the reduction algorithm to a segmented reduction algorithm utilizing computer code embodied on a computer readable medium, wherein the segmented reduction algorithm includes a forward segmented reduction algorithm or a backward segmented reduction algorithm; and
performing the segmented reduction algorithm, utilizing a processor, to produce an output;
wherein the segmented reduction algorithm is performed in connection with a sparse matrix-dense vector multiplication operation.

2. The method of claim 1, wherein the converting is performed utilizing hardware.

3. The method of claim 2, wherein the hardware includes a parallel architecture.

4. The method of claim 2, wherein the hardware includes a graphics processor.

5. The method of claim 1, wherein the segmented reduction algorithm is performed for avoiding a full segmented scan.

6. The method of claim 1, wherein the segmented reduction algorithm is performed on a plurality of elements of an array, in parallel.

7. The method of claim 1, wherein the segmented reduction algorithm is performed utilizing an index data structure.

8. The method of claim 7, wherein the index data structure includes an index of a last element in a subset of an array.

9. The method of claim 7, wherein the index data structure includes an index of a first element in a subset of an array.

10. The method of claim 7, wherein the segmented reduction algorithm is performed utilizing at least one head flag.

11. The method of claim 1, and further comprising performing a segmented scan algorithm on the output to generate an additional output.

12. The method of claim 11, and further comprising adding the additional output to the output of the segmented scan algorithm.

13. The method of claim 12, wherein the additional output is added to only a first and last element of the output of the segmented scan algorithm.

14. A computer program product embodied on a non-transitory computer readable medium, comprising:
computer code for identifying a reduction algorithm;
computer code for converting the reduction algorithm to a segmented reduction algorithm, wherein the segmented reduction algorithm includes a forward segmented reduction algorithm or a backward segmented reduction algorithm; and
computer code for performing the segmented reduction algorithm to produce an output;
wherein the segmented reduction algorithm is performed in connection with a sparse matrix-dense vector multiplication operation.

15. An apparatus, comprising:
a processor for identifying a reduction algorithm, converting the reduction algorithm to a segmented reduction algorithm utilizing computer code embodied on a computer readable medium, wherein the segmented reduction algorithm includes a forward segmented reduction algorithm or a backward segmented reduction algorithm, and performing the segmented reduction algorithm to produce an output;

wherein the segmented reduction algorithm is performed in connection with a sparse matrix-dense vector multiplication operation.

16. The apparatus of claim 15, wherein the processor remains in communication with memory and a display via a bus.

* * * * *